United States Patent [19]
Sigwart et al.

[11] Patent Number: 5,945,575
[45] Date of Patent: Aug. 31, 1999

[54] METHOD OF PRODUCING REACTIVE HALOGEN-FREE, POLYISOBUTENE

[76] Inventors: Christoph Sigwart, Kurpfalzstr:9, 69198 Schriesheim; Eugen Gehrer, Londoner Ring 2, 67069 Ludwigshafen; Ulrich Müller, Birkenweg 16, 67434 Neustadt; Hans Peter Rath, Friedhofstr:7, 67269 Grünstadt; Rolf Fischer, Bergstr:98, 69121 Heidelberg, all of Germany

[21] Appl. No.: 09/011,100

[22] PCT Filed: Aug. 5, 1996

[86] PCT No.: PCT/EP96/03441

§ 371 Date: Jan. 27, 1998

§ 102(e) Date: Jan. 27, 1998

[87] PCT Pub. No.: WO97/06189

PCT Pub. Date: Feb. 20, 1997

[30] Foreign Application Priority Data

Aug. 7, 1995 [DE] Germany .................. 195 28 942

[51] Int. Cl.⁶ .............. C07C 2/02; C08F 10/00; C08F 4/18
[52] U.S. Cl. ............... 585/531; 585/520; 585/526; 585/527; 585/530; 526/348.7; 526/107
[58] Field of Search ............... 585/526, 527, 585/530, 531, 520; 526/348.7, 107

[56] References Cited

U.S. PATENT DOCUMENTS

| | | | |
|---|---|---|---|
| 4,288,649 | 9/1981 | McCaulay | 585/533 |
| 4,918,041 | 4/1990 | Hollstein et al. | 502/217 |
| 4,956,519 | 9/1990 | Hollstein et al. | 585/751 |
| 5,191,044 | 3/1993 | Rath et al. | 526/348.7 |
| 5,191,139 | 3/1993 | Sanderson et al. | 585/520 |
| 5,286,823 | 2/1994 | Rath | 526/237 |
| 5,326,920 | 7/1994 | Ho et al. | 585/528 |
| 5,408,018 | 4/1995 | Rath | 526/348.7 |
| 5,516,851 | 5/1996 | Flick et al. | 502/159 |

FOREIGN PATENT DOCUMENTS

| | | |
|---|---|---|
| 145 235 | 6/1985 | European Pat. Off. . |
| 244 616 | 11/1987 | European Pat. Off. . |
| 27 02 604 | 1/1977 | Germany . |
| 56-139429 | 10/1981 | Japan . |

OTHER PUBLICATIONS

HSU et al., *J. Chem. Soc. Chem. Commun.*, 1992, pp. 1645–1646.
Gueterbock, *Polyisobutylen und Isobutylen–Mischpolymerisate*, pp. 77–104, 1959.
Gueterbock et al., Polyisobutylene und . . . 1959, 77–104.
J. Chem. Soc. Chem. Commun, 1992, 1645–1646.

*Primary Examiner*—Glenn A. Caldarola
*Assistant Examiner*—In Suk Bullock

[57] ABSTRACT

A process for the preparation of halogen-free, reactive polyisobutene having a content of terminal double bonds of more than 50 mol % and an average molecular weight $M_n$ of from 500 to 5000 dalton by the cationic polymerization of isobutene or isobutene-containing hydrocarbon mixtures in the liquid phase, wherein the polymerization is carried out at a temperature of from $-30°$ to $+40°$ C. over a heterogeneous polymerization catalyst containing at least one element acting as promoter and selected from Group IB, Group IIB, Group IIIB, Group IVB, Group VB, Group VIIB, or Group VIIIB of the Periodic Table or from Group IIA, Group IIIA, Group IVA, Group VA, or Group VIA of the Periodic Table or a number of said elements in each case in the form of an oxygen-containing compound and zirconium in the form of an oxygen-containing compound, said polymerization catalyst containing no industrially effective amounts of halogens.

20 Claims, No Drawings

METHOD OF PRODUCING REACTIVE HALOGEN-FREE, POLYISOBUTENE

The present invention relates to a process for the preparation of halogen-free, reactive polyisobutene having a content of terminal double bonds of more than 50 mol % and an average molecular weight $M_n$ of from 500 to 5000 dalton by the cationic polymerization of isobutene or isobutene-containing hydrocarbon mixtures in the liquid phase.

In the polymerization of isobutene a non-separable mixture of polyisobutenes having varying positioning of the double bond in the individual polyisobutenes is formed. Polyisobutenes of formula I

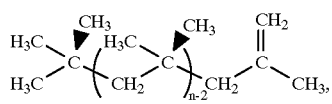

in which n indicates the degree of polymerization, which in turn ensues from the average molecular weight $M_n$ of the polyisobutene prepared, contain terminal vinylidene-type C—C double bonds, which are also designated as α-olefinic double bonds in this application due to their position in the polyisobutene molecule. Accordingly the double bonds in polyisobutenes of formula II

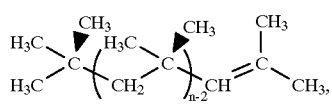

are designated as being β-olefinic. If no particular measures are taken in the polymerization of isobutene, there is formed a statistical mixture of polyisobutenes containing α-olefinic, ie terminal, β-olefinic double bonds and also some located more in the interior of the polyisobutene molecule. The content of terminal double bonds in a polyisobutene product prepared according to a specified manufacturing method as also the content of β-olefinic double bonds is given in mol %.

Polyisobutenes having molecular weights of up to 100,000 dalton are known. The preparation of these olefins, which is described, for example, in H. Güterbock, Polyisobutylene und Mischpolymerisate, pp 77–104, Springer Verlag, Berlin, 1959, is usually effected by Lewis acid-catalyzed isobutene polymerization, the Lewis acids used being aluminum chloride, alkylaluminum chloride, or boron trifluoride. However, the polymers thus obtained have a relatively small content of terminal vinylidene-type C—C double bonds of less than 10 mol %.

On the other hand, reactive polyisobutene (PIB) having molecular weights usually ranging from 500 to 5000 dalton possesses a high content of terminal vinylidene groups, preferably more than 50 mol %. These reactive polyisobutenes are used as intermediates for the preparation of additives for lubricants and fuels, as described, for example, in DE-A 2,702,604. In order to prepare these additives polyisobutene is first of all caused to react with maleic anhydride. In this operation the terminal vinylidene-type double bonds preferentially react, whereas double bonds situated more in the interior of the macromolecule, react to a lesser extent or not at all depending on their position in the molecule. The polyisobutene/maleic anhydride adducts formed are subsequently converted to the corresponding additives by reaction with specific amines. A high content of terminal double bonds is therefore absolutely necessary for polyisobutenes used as starting materials for said additives. The same applies to the preparation of polyisobutene amines likewise used as fuel additives according to EP-A 244,616, which are produced by hydroformylation of the reactive polyisobutene and subsequent reductive amination of the polyisobutene aldehyde thus obtained. Here polyisobutene having a high content of terminal double bonds is again preferably used, but β-olefinic polyisobutenes are also hydroformylated to form the desired product in hydroformylation using cobalt catalysts, on account of their double bond isomerization activity.

The preparation of reactive polyisobutene by the polymerization, effected by homogeneous catalysis, of isobutene is already known. For example, according to DE-A, 2,702,604 there is obtained, by reaction of isobutene in the presence of boron trifluoride, a polyisobutene product having a content of terminal double bonds of up to 88%. EP-A 145,235 teaches the polymerization of isobutene in the presence of a complex of boron trifluoride and a primary alcohol at temperatures ranging from –100° to +50° C., where products having similarly high contents of vinylidene double bonds are obtained. Using complexes of boron trifluoride and secondary alcohols as catalyst highly reactive polyisobutene can also be prepared, according to U.S. Pat. No. 5,286,823.

A drawback of this homogeneously catalyzed process is that the Lewis acid catalysts used are corrosive and there is the danger that, in addition to the desired, reactive polyisobutene, halogenated polymeric by-products may form which are virtually inseperable from PIB and have an undesirable effect on the properties of the product PIB and its post-processing properties. The separation of the homogeneous catalyst is effected in this process usually by quenching with a nucleophilic substance, by which means the catalyst is destroyed, followed by extractive separation of the PIB from the quenched mixture. These additional purifying steps are a further drawback of the homogeneously catalyzed process for the preparation of PIB.

The preparation of PIB with the assistance of heterogeneous catalysts is likewise known. U.S. Pat. No. 4,288,649 describes processes for the preparation of polyisobutene having an average molecular weight of >1250 dalton by the polymerization of isobutene-containing $C_4$ hydrocarbon mixtures over halogenated aluminum oxide catalysts. These catalysts are prepared by the treatment of aluminum oxide with a halogenating agent, preferably a chlorinating agent, in particular with carbon tetrachloride, at elevated temperature. This process suffers from the drawback that some of the chlorine is transferred from the catalyst to the polymer being formed. For example the polymerization of a mixture of n-butane, isobutane, and isobutene over a thus prepared, chlorinated aluminum oxide catalyst produces, after a reaction time of 2 hours, a polyisobutene product having a chlorine content of 46 ppm.

U.S. Pat. No. 5,326,920 relates to an isobutene polymerization process, in which an oxidic support material, preferably silicon dioxide, which has been activated with an attached metal chloride, preferably an aluminum chloride, is used as heterogeneous catalyst. It is particularly preferred, according to this specifica- tion, to use an $SiO_2$—$AlCl_2$ catalyst, in which $AlCl_2$ groups are anchored to the $SiO_2$ support via oxygen bridges. A disadvantage of this process is that the polyisobutene products obtained have an extremely wide distribution of molecular weights D of from 8 to 14, their content of terminal double bonds is small and their chlorine content is in the ppm range. In addition this process requires the presence of promotors such as water, alcohols, alkyl halides, or hydrogen chloride, in order to achieve a catalyst activity sufficient for commercial operation.

In JP-A 139429/1981 zirconium dioxide-containing and molybdenum oxide-containing heterogeneous catalysts are used for the preparation of isobutene oligomers having a molecular weight of less than 300 dalton. To increase their activity these catalysts may contain added aluminum fluoride. For example, according to this specification, during the reaction of an isobutene-containing $C_4$ cut (composition: 46% of isobutene, 28% of 1-butene, 8% of 2-butene isobutene, 12% of n-butane, 5% of isobutane, 1% of 1,3-butadiene) at 120° C. over a $MoO_3$—$ZrO_2$ catalyst having a molybdenum content of 13 wt %, calculated as $MoO_3$, there is obtained a mixture of isobutene oligomers which comprises 29%, 49% and 19% of di-, tri- and tetra-isobutene respectively.

It is thus an object of the present invention, to provide a process for the preparation halogen-free, reactive polyisobutene having a content of terminal double bonds of more than 50 mol %, a content of terminal and β-olefinic double bonds of more than 80 mol % and an average molecular weight of from 500 to 5000 dalton, with the assistance of a heterogeneous catalyst. The PIB produced by this process prepared should have a narrow distribution of molecular weights D of less than 4. Another object is to find suitable heterogeneous catalysts for the execution of this process, by means of which the polyisobutene synthesis process can be operated economically.

Accordingly, we have found a process for the preparation of halogen-free, reactive polyisobutene having a content of terminal double bonds of more than 50 mol % and an average molecular weight $M_n$ of from 500 to 5000 dalton by the cationic polymerization of isobutene or isobutene-containing hydrocarbon mixtures in the liquid phase, wherein the polymerization is carried out at a temperature of from −30° to +40° C. over a heterogeneous polymerization catalyst containing at least one element acting as promoter and selected from Group IB, Group IIB, Group IIIB, Group IVB, Group VB, Group VIIB, or Group VIIIB of the Periodic Table or from Group IIA, Group IIIA, Group IVA, Group VA, or Group VIA of the Periodic Table or a number of said elements in each case in the form of an oxygen-containing compound and zirconium in the form of an oxygen-containing compound, said polymerization catalyst containing no industrially effective amounts of halogens.

Unlike pure zirconium dioxide, which is virtually inactive as a catalyst for the polymerization of isobutene or has only very low catalytic activity, the catalysts to be used in the invention have good to very good activity and selectivity for the polymerization of isobutene to form reactive, low molecular weight polyisobutene having a content of terminal double bonds of more than 50 mol % and an average An molecular weight of from 500 to 5000 dalton and also a relatively narrow distribution of molecular weights D of less than 4. Since no halogenated compounds have to be added to the catalysts to be used in the invention to attain high activity and selectivity, they make the economical preparation of halogen-free PIB possible.

As explained in detail below, the manner of manufacture of the catalysts to be used in the invention leads to the assumption that the predominant part of the oxygen-containing zirconium compounds present in these catalysts exists as zirconium dioxide, for which reason we speak of zirconium dioxide catalysts, doped zirconium dioxide, zirconium dioxide support material, etc below for simplification and by way of illustration.

In the process of the invention zirconium dioxide ($ZrO_2$) catalysts are used which contain at least one element acting as promoter and selected from Group IB, Group IIB, Group IIIB, Group IVB, Group VB, Group VIIB, or Group VIIIB of the Periodic Table or from Group IIA, Group IIIA, Group IVA, Group VA, or Group VIA of the Periodic Table, or a number of said elements in the form of an oxygen-containing compound attached to zirconium dioxide.

The elements "acting as promoter" are, within the scope of the present invention, those elements whose oxygen-containing compounds alone or in combination with oxygen-containing compounds of other elements, produce, together with and in cooperation with zirconium dioxide in the finished catalyst, a catalytic activity of such doped zirconium dioxide-containing catalysts which is many times greater than that of undoped zirconium dioxide in the polymerization of isobutene to produce halogen-free, reactive polyisobutene having an average molecular weight of from 500 to 5000 dalton. Thus the halogens are not be regarded as promoter-effective elements within the scope of the present invention.

Preferred promoter-active elements in Group IB of the Periodic Table are copper and silver. The preferred promotor-effective element in Group IIB of the Periodic Table is zinc. Of the Group IIIB elements, the so-called rare earth metals, those preferred are, due to their availability, scandium, yttrium, lanthanum, cerium, neodymium, and praseodymium, although the other rare earth metals have, as may be expected, similarly good promoter properties as the aforementioned rare earth metals. Titanium and hafnium of Group IVB of the Periodic Table are likewise effective as promoters; due to its lower price titanium is preferred over hafnium. Vanadium, niobium, and tantalum of Group VB of the Periodic Table have, when compared with each other, similarly good promoter properties. Of the elements in Group VIIB of the Periodic Table, manganese and rhenium can be advantageously used as promoter elements, where manganese usually has better promoter properties than rhenium. Of the elements in Group VIIIB those preferably used as promoter elements are iron, cobalt, and nickel. Although the platinum metals ruthenium, rhodium, palladium, osmium, iridium, and platinum are well-suited for use as as promoter elements, they are less preferably used, due to their high price, than the remaining elements in Group VIIIB.

Of the elements in Group IIA of the Periodic Table, beryllium, magnesium, calcium, strontium, and barium can be used as promoter elements; preferably calcium and magnesium are used. Of the elements in Group IIIA of the Periodic Table, boron, aluminum, gallium, and indium, in particular boron, aluminum, and gallium, are preferred promoter-active elements, whereas relevant elements in Group IVA of the Periodic Table are silicon, germanium, tin, and lead, in particular silicon and the tin. Phosphorus in Group VA and sulfur in Group VIA of the Periodic Table have proven to be very suitable for use in the process of the invention as promoter elements, but arsenic, antimony, bismuth, selenium, and tellurium may also be used as promoter elements.

Of the aforementioned promotor-effective elements, those preferred are sulfur and phosphorus and also manganese, iron, cobalt, nickel, zinc, tin, aluminum, silicon, calcium, and magnesium, whilst the promoter elements manganese, iron, cobalt and aluminum are particularly noteworthy.

In the process of the invention $ZrO_2$ catalysts can be used to particular advantage which contain a number of elements acting as promoters, attached to zirconium dioxide. Preferred are for example such combinations of promoter-active elements as contain, in addition to sulfur or phosphorus, one or more elements of said subgroups and/or main groups of the Periodic Table, preferably of Group IIB, Group VIIB, and/or Group VIIIB and/or of Group IIA, Group IIIA, and/or Group VIA of the Periodic Table. Particularly preferred combinations of promoter-active elements are eg combinations of sulfur and/or phosphorus with iron, iron/manganese, manganese, or iron/aluminum.

Apart from its elementary composition, the exact chemical structure of the catalysts to be used in the invention is virtually unknown. Possibly the promoter-active elements form mixed oxides or mixed valence oxides with the zirconium dioxide, which oxides generate catalytically active centers and thus catalyze the isobutene polymerization. Possibly the promoter-active elements are attached to the surface of the zirconium dioxide by chemical bonds, for example via oxygen bridges, as described in Rare Metals 11, 185 (1992), and in this way cause the catalytic activity of the doped zirconium dioxide, which, without such doping, develops virtually no catalytic activity in the process of the invention. Thus it is not possible to make any definite statement concerning the mode of action of these catalysts: some of the catalysts which may be used in the invention are found to be strong acids when determining their acidity by Hammett titration, others are found to be virtually neutral when subjected to this titration method but nevertheless catalyze the isobutene polymerization to produce the desired high content of terminal double bonds.

In view of the manner in which they are prepared, there is reason to suppose, as mentioned above, that the greater part of the zirconium in the catalysts to be used in the invention exists as zirconium dioxide and the oxygen-containing compounds of the promoter elements are attached to the zirconium dioxide, for example by formation of mixed oxides with the zirconium dioxide or by the aforementioned chemical bonding to the surface of the zirconium dioxide. Consequently this application also speaks of oxygen-containing compounds of the promoter-effective elements attached to zirconium dioxide. Since the chemical structure the catalysts to be used in the invention is unknown, characterization of the individual catalysts is effected by stating the content of zirconium and promoter elements therein, in percent by weight, calculated as Zr and the respective promoter element respectively, based on the total weight of the calcined catalyst. The remainder up to 100 wt % comprises for the most part oxygen attached to these elements, or industrially ineffective impurities, eg alkali metal compounds, which enter the catalysts during manufacture thereof. Hydrogen in chemically combined form, eg in the form of OH groups or in the form of water of crystallization not capable of being removed even under calcining conditions, can also be present in the catalysts to be used in the invention, following calcination there. In general, the molar ratio of zirconium, calculated as Zr, to the element or, cumulatively, elements present in the catalyst as promoter effective element(s) in each case calculated as the respective element, ie Zr:promoter element(s), is from 50:50 to 99.9:0.1, preferably from 54:46 to 99.7:0.3 and more preferably from 80:20 to 98:2. Alkali metals, if present, usually in the form of oxygen-containing alkali metal compounds, can, due to their method of manufacture, be present in the catalyst in amounts of up to 1 wt %, eg from 0.1 to 1 wt %, in each case calculated as alkali metal. The alkali metals can be entrained into the catalysts, eg by the use of alkali metal-containing precipitating agents or via alkali metal impurities in, or components of, the compounds of the promoter-active elements used for promotion.

The polymerization catalysts to be used in the invention are generally and preferably free from halogen. However, depending on their manner of preparation, in particular depending on the halogen content of the raw materials used for their preparation, these catalysts can be contaminated by halogens unavoidably carried over on an industrial scale by said raw materials in amounts which are industrially ineffective however and have no promoter action and also do not lead to the formation of halogenated polyisobutene. The reason for the industrial inactivity of such undesirable halogen contaminations in the catalysts to be used in the invention is that these impurities are distributed over the catalyst non-specificly and are not part of the catalytically active centers. This is one of the differences between the catalysts to be used in the invention and the halogen-containing catalysts described in U.S. Pat. No. 4,288,649 or U.S. Pat. No. 5,326,920, in which halogens are purposely incorporated in the catalytically active centers of the catalyst. The amount of industrially unavoidable halogen contaminations in the catalysts to be used in the invention is in general less than 1000 ppm by weight, preferably less than 100 ppm by weight of halogens, in each case based on the total weight of the calcined catalyst. However, it is particularly preferred to use halogen-free catalysts.

The preparation of the catalysts to be used in the invention is generally effected by treating zirconium hydroxide (Zr(OH)$_4$), which is very often referred to as zirconium dioxide hydrate (ZrO$_2$.2H$_2$O) in technical literature, with a solution, preferably an aqueous solution, of the respective promotor-active element(s), subsequently drying the thus treated zirconium hydroxide at temperatures of in general from 80° to 150° C., preferably from 100° to 120° C., under atmospheric pressure or reduced pressure and calcining the dried, promotor element-containing, amorphous zirconium hydroxide at temperatures of in general from 300° to 1000° C., preferably from 350° to 900° C. and more preferably from 400° to 800° C. preferably in an oxygen-containing atmosphere, for example in the presence of air.

The zirconium hydroxide used for the preparation of the catalysts to be used in the invention is commercially available or can be precipitated in known manner from aqueous solutions of zirconium salts such as zirconyl nitrate (ZrO(NO$_2$)$_2$), zirconyl sulfate (ZrO(SO$_4$)), zirconium sulfate (Zr(SO$_4$)$_2$) or zirconyl carboxylates, eg zirconyl acetate or zirconyl oxalate, or solutions of zirconium complex compounds, by the addition of a base such as ammonia, alkali metal carbonate, or alkali metal hydroxide. Organic bases such as urea or urotropine (hexamethylenetetramine) can also be used for this purpose, whilst precipitation is advantageously carried out at the boil when use is made of urea or urotropine. Alternatively, the zirconium hydroxide can be produced from hydrolysable zirconium compounds such as zirconium alcoholates, for example zirconium methanolate (Zr(OCH$_3$)$_4$) or zirconium isopropanolate (Zr(OCH(CH$_3$))$_4$) by hydrolysis. The zirconium hydroxide is produced in this process usually as an amorphous, gel-like precipitate.

The promotor-effective element(s) can be applied to the zirconium hydroxide gel following precipitation thereof by an impregnating technique or by co-precipitation thereof together with the zirconium hydroxide by a mixed precipitating technique.

In the co-precipitation method, the desired promoter-active elements, in general in the form of water-soluble salts or complexes thereof, preferably, if the promoter element is a metal, in the form of nitrates or acetates thereof, are added to the zirconium salt solution to be precipitated and these elements are precipitated, as described, together with the zirconium hydroxide, as hydroxides, carbonates or basic salts. If the promoter element is a non-metal, for example water-soluble zirconium salts containing the respective promoter element, eg zirconyl sulfate, can be used for precipitation, or a water-soluble salt compound of the respective promoter element or an acid containing the same may be added during precipitation in addition to the base, by which means difficultly soluble zirconium salts having anions containing the respective promoter element, eg zirconium phosphate, zirconium borate, or zirconium silicate, are co-precipitated during said precipitating operation. Also complex compounds of metals, effective as promoters, for example ammonium rhenate or other soluble salts, for example alkali metal salts, of such complex compounds, can be added in the aforementioned manner during precipitation of the zirconium.

The impregnating treatment of the zirconium hydroxide gel to apply the promotor-active elements is advantageously carried out by stirring a slurry of the zirconium hydroxide gel with an aqueous salt solution, complex solution, or acid solution, of the promoter element(s) to be applied, after which the water is removed by distillation and drying. Instead of aqueous salt solutions or acid solutions of the promoter elements, the impregnation may alternatively be carried out using solutions of thermally decomposable, difficultly volatile organic compounds of the promoter elements, for example organometallic compounds, in preferably polar organic solvents such as alcohols, tetrahydrofuran, N,N-dimethylformamide, N-methylpyrrolidone, or dimethyl sulfoxide.

The impregnation with one or more promoter elements can be carried out in one or more stages. For example, a solution containing several promoter-active elements may be used for the impregnation or the impregnating treatment of zirconium hydroxide gel can be carried out in a number of successive impregnating steps by impregnation using solutions containing in each case only one of the promoter elements. Advantageously, the impregnation may be carried out using solutions of compounds composed of several promoter elements, for example heteropoly acids or water-soluble salts there.

Following application of the promoter-active elements, the zirconium hydroxide gel is dried as described above and calcined at the temperatures stated above. The calcining period is in general from 1 to 20 hours, preferably around 3 hours. During calcination under said conditions the compounds of the promoter elements applied to the $ZrO_2$ support material are converted to catalytically active, oxygen-containing compounds. The calcination can be carried out in the presence of oxygen-containing gases, eg air, or alternatively und er an inert gas atmosphere, eg under a blanket of nitrogen. Preferably, calcination is carried out in the presence of air. It may be pointed out at this juncture that the calcining conditions used for each individual catalyst must be adjusted according to its composition, the manner in which the promoter elements are applied to the zirconium hydroxide gel, and the type of compounds of the promoter-active elements used for this purpose, if optimum results are to be achieved in the process of the invention. However, the individual settings of these calcining conditions within the framework of the given calcining temperatures and calcining times are readily determined by the person skilled in the art in a few simple routine experiments.

Some the catalysts to be used in the invention are known, for example those described in J. Chem. Soc. Chem. Commun. 1645 (1992), U.S. Pat. No. 4,918,041 and U.S. Pat. No. 4,956,519 and consisting of zirconium dioxide catalysts containing iron, manganese, and sulfur as promoter elements, which catalysts have hitherto only been used in processes for n-butane-isomerisation.

The catalysts to be used in the invention are advantageously conditioned prior to their use in the process of the invention, that is to say, they are molded in conventional manner to shaped articles such as pellets, balls, cylinders, rings or spirals, or crushed to gravel and used in the reacotr in this form preferably as a fixed-bed, or they are ground to a powder and used in this form, advantageously as suspension catalysts. The catalysts to be used in the invention can be stored for virtually unlimited period, preferably with the exclusion of moisture. Catalysts which have become moist are advantageously dried prior to use in the process of the invention under atmospheric pressure or under reduced pressure—at atmospheric pressure generally at temperatures above 150° C., preferably at from 180° to 300° C., whilst under reduced pressure drying can of course be carried out at lower temperatures if desired.

The starting material used for the process of the invention can be either pure isobutene or isobutene-containing hydrocarbon mixtures such as refined $C_4$ products or isobutane/isobutene mixtures coming from the dehydration of isobutane. By refined $C_4$ products we mean hydrocarbon mixtures that have been obtained by substantial removal, ie removal leaving only traces, of 1,3-butadiene, for example by extraktive destillation, from the $C_4$ cut leaving steam crackers or FCC crackers (FCC: fluid catalyzed cracking), (cf Weissermel, Arpe: Industrial Organic Chemistry, pp 69, 102–103, 2. Edition, Verlag Chemie 1978).

The process of the invention can be carried out batchwise or continuously at temperatures of in general from −30° to +40° C., preferably from −20° to +30° C. and more preferably from −10° to +20° C., under atmospheric pressure or elevated pressure, in particular under the autogenous pressure of the reaction system, such that the isobutene remains liquid. Use can be made of conventional reactors such as stirred reactors or loop reactors in the batchwise mode, or loop reactors or cascades of reactors in the continuous mode of operation of the process. Similarly the continuous variant of the process of the invention can advantageously involve the use of tubular reactors in which the fluid medium can flow upwardly or downwardly or cascades of such tubular reactors. The catalysts to be used in the invention can be disposed in a fixed bed, or be suspended in powder form in the reaction medium, particularly when loop reactors or tubular reactors are used. The isobutene polymerization can be carried out in the presence or absence of a preferably non-polar, halogen-free solvent, preferably a hydrocarbon. When isobutene-containing hydrocarbon mixtures are used as starting material the hydrocarbons present therein in addition to the isobutene act as solvent or diluent. Since the isobutene polymerization is exothermal, it may advantageous to equip the reactors used with means for internal or external cooling.

Adjustment of the desired average molecular weight $M_n$ of the polyisobutene can be effected in the process of the invention by varying the reaction parameters.

In the batchwise process this adjustment of the average molecular weight $M_n$ is generally effected by varying the amount of catalyst used, the reaction time, and the reaction temperature. The reaction time is governed by the amount of catalyst used and is generally from 0.01 to 10 hours, preferably from 0.1 to 8 hours. In the batchwise embodiment of the process of the invention the catalyst is in general added in an amount of from 0.1 to 50 wt %, preferably from 0.5 to 20 wt % and more preferably from 1 to 10 wt %, always based on the weight of the isobutene present in the starting material used. Advantageously, the optimal polymerization conditions for the preparation of polyisobutene of a desired average molecular weight $M_n$ according to catalyst and starting material used are ascertained in preliminary tests. In the continuous mode of operation of the process of the invention the adjustment of the average molecular weight $M_n$ is effected in a corresponding manner, but in this case not the amount of catalyst used but the reaction parameters space velocity and residence time are varied.

The isolation of the polyisobutene from the polymerization mixture involves in general no process engineering peculiarities and can, when use is made of a suspended catalyst which has been removed, for example by filtration, centrifugation, or decantation, be carried out by distillation, this being achieved by first of all removing, by distillation, readily volatile components of the polymerization mixture, such as unconverted isobutene and hydrocarbons present in the starting material or added as solvent, and then separating, by distillation, higher-boiling by-products, for example low molecular weight isobutene oligomers, of polyisobutene.

The process of the invention provides economical preparation of reactive, halogen-free polyisobutene having an average molecular weight $M_n$ of from 500 to 5000 dalton and a content of terminal double bonds of more than 50 mol %.

EXAMPLES

I. Preparation of the Catalysts

As starting material for the preparation of the catalysts A to I there was used a commercially available, moist zirconium hydroxide paste sold by MEL-Chemicals, Manchester, England (Chemical Abstracts Service (CAS)-No. 14475-63-9) having a zirconium content, calculated as $ZrO_2$, of 47 wt %. The catalysts A to P were prepared and used in the form of powder.

The contents of Zr, Sc, Nb and Re in the individual catalysts were ascertained by means of X-ray fluorescence analysis (literature: R. Bock: Methoden der Analytischen Chemie; Vol 2: Nachweis- und Bestimmungsmethoden Teil 1, Verlag Chemie, Weinheim 1980), the contents of P, S. Ca, Mg, Al, Ni, Co, Fe and Mn in the individual catalysts were determined by ICP (inductively coupled plasma atom emmission spectroscopy (literature: A. Montaser; D. W. Golightly: Inductively Coupled Plasmas in Analytical Atomic Spectrometry; 2nd Ed., VCH Verlagsgesellschaft, Weinheim).

Prior to the determination of these elements the calcined catalysts were again dried to constant weight and in this form directly passed on for analysis.

Catalyst A 442 g of $Zr(OH)_4$ paste were impregnated with a solution of 32.4 g of $Fe(NO_3)_3 \cdot 9H_2O$, 10.5 g of $MnSO_4 \cdot H_2O$ and 16.4 g of $(NH_4)_2SO_4$ in 1000 ml of water. For this purpose the paste was stirred with this impregnation solution for 1 h, after which the water was removed in a rotation evaporator. The remaining solid material was dried for 5 h at 110° C. and subsequently calcined for 3 h at 650° C. Following calcination, catalyst A had the following composition:

Zr: 69 wt %

Fe: 1.7 wt %

Mn: 1.3 wt %

S: 1.1 wt %

All of the percentages by weight, including those in the following catalyst synthesis examples, are based on the total weight of the calcined catalyst.

Catalyst B

In the manner described above for the preparation of Catalyst A, 224 g of $Zr(OH)_4$ paste were impregnated with a solution of 16.2 g of $Fe(NO_3)_3 \cdot 9H_2O$ and 8.2 g of $(NH_4)_2SO_4$ in 500 mL of water, dried, and calcined. The calcined Catalyst B had the following composition:

Zr: 69 wt %

Fe: 1.8 wt %

S: 1.8 wt %

Catalyst C

In the manner described above for Catalyst A, 224 g of $Zr(OH)_4$ paste were, with a solution of 5.25 g of $MnSO_4 \cdot H_2O$ and 8.2 g of $(NH_4)_2SO_4$ in 500 mL of water impregnated, dried and calcined. The calcined Catalyst C had the following composition:

Zr: 71 wt %

Mn: 1.4 wt %

S: 0.9 wt %

Catalyst D

In the manner described above for Catalyst A, 224 g of $Zr(OH)_4$ paste were impregnated with a solution of 15.0 g of $Al(NO_3)_3 \cdot 9H_2O$, 7.24 g of $Fe(NO_3)_3 \cdot 9H_2O$ and 8.2 g of $(NH_4)_2SO_4$ in 500 mL of water, dried, and calcined. The calcined Catalyst D had the following composition:

Zr: 70 wt %

Al: 0.6 wt %

Fe: 1.6 wt %

S: 0.7 wt %

Catalyst E

In the manner described above for the preparation of Catalyst A, 100 g of $Zr(OH)_4$ paste were impregnated with a solution of 7.24 g of $Fe(NO_3)_3 \cdot 9H_2O$ and subsequently with 11.8 g of 85% strength phosphoric acid in 100 mL of water, and dried. The mixture was then calcined for 3 h at 550° C. The calcined Catalyst E had the following composition:

Zr: 66 wt %

Fe: 1.0 wt %

P: 3.1 wt %

Catalyst F

In the manner described above for the preparation of Catalyst A, 100 g of $Zr(OH)_4$ paste were impregnated with a solution of 4.57 g of $Mn(NO_3)_2 \cdot 4H_2O$ and subsequently with 11.8 g of 85% strength of phosphoric acid in 100 mL of water, and dried and then calcined for 3 h at 550° C. The calcined Catalyst F had the following composition:

Zr: 66 wt %

Mn: 1.1 wt %

P: 3.0 wt %

Catalyst G

In the manner described above for the preparation of Catalyst A, 90 g of $Zr(OH)_4$ paste were impregnated with a solution of 16.24 g of 85% strength phosphoric acid in 250 mL of water. The resulting solids were dried for 5 h at 120° C. and then calcined for 3 h at 550° C. Catalyst G had the following composition:

Zr: 62 wt %

P: 5.0 wt %

Catalyst H

To a solution of 32.2 g of zirconyl nitrate and 0.71 g of Ca(NO$_3$)$_2$.4H$_2$O in 200 mL of water there were slowly added ca 50 mL of a 25% strength ammonia solution, until the pH was 9. The suspension of the resulting precipitate was stirred for a further 2 h in the supernatant liquid, then filtered off, dried at 110° C. overnight and calcined for 3 h at 600° C. under a blanket of nitrogen. The calcined Catalyst H had the following composition:

Zr: 73 wt %
Ca: 0.1 wt %

Catalyst I

In the manner described above for the preparation of Catalyst A, 111 g of Zr(OH)$_4$ paste were impregnated with a solution of 12.8 g of Mg(NO$_3$)$_2$.6H$_2$O in 250 mL of water and dried. The resulting solid material was calcined for 3 h at 800° C. Catalyst I had the following composition:

Zr: 72 wt %
Mg: 1.3 wt %

Catalyst K 25 g of ZrO$_2$ paste were suspended in a solution of 38 g of niobium ammonium oxalate (manufactured by H.C. Starck, Goslar) in 400 g of 5% strength, aqueous oxalic acid solution and stirred for 2 h at 60° C., after which the water was removed in a rotation evaporator. The resulting solid material was dried overnight at 110° C. and then calcined, at first for 2 h at 350° C. and then for another 2 h at 700° C. The calcined Catalyst K had the following composition:

Zr: 51 wt %
Nb: 24 wt %

Catalyst L 250 g of Zr(OH)$_4$ paste were suspended in a solution of 54.4 g of ammonium perrhenate (NH$_4$ReO$_4$) in 1000 g of 5% strength aqueous oxalic acid solution and then stirred for 2 h at 60° C. The water was then removed in a rotation evaporator and the resulting solid material dried overnight at 110° C. The solids were then calcined, at first for 2 h at 350° C. and then for 2 h at 700° C. There were obtained 100 g of Catalyst L having the following composition:

Zr: 59 wt %
Re: 13 wt %

Catalyst M 93.5 g of zirconyl chloride (ZrOCl$_2$.8H$_2$O) and 2.0 g of scandium nitrate (Sc(NO$_3$)$_3$.6H$_2$O) were dissolved in 1000 mL of water and precipitated with 57 mL of 25% strength aqueous ammonia solution. The pH following precipitation was 9.0. The precipitate was stirred, for ageing, for 2 h in the precipitation solution, filtered off, and washed free of chloride. The precipitate was dried overnight at 110° C., and calcined for 3 h at 600° C. The resulting catalyst contained 69 wt % of Zr and 3.3 wt % of Sc. Its chlorine content was less than 0.1 wt %.

Catalyst N 99.5 g of Zr(OH)$_4$ paste (80.0 g of ZrO$_2$) were impregnated with a solution of 11.5 g of nickel nitrate (Ni(NO$_3$)$_2$.6H$_2$O) in 100 mL of water and subsequently evaporated to dryness in a rotation evaporator. Following drying at 110° C. the catalyst was calcined for 16 h at 500° C. The resulting catalyst contained 71 wt % of Zr and 2.9 wt % of Ni.

Catalyst O 99.5 g of Zr(Oh)$_4$ paste (80.0 g of ZrO$_2$) were impregnated with a solution of 11.5 g of cobalt nitrate (Co(NO$_3$)$_2$.6H$_2$O) in 100 mL of water and subsequently evaporated to dryness in a rotation evaporator. Following drying at 110° C. the catalyst was calcined for 16 h at 500° C. The resulting catalyst contained 71 wt % of Zr and 2.8 wt % of Co.

Catalyst P 99.5 g of Zr(OH)$_4$ paste (80.0 g of ZrO$_2$) were impregnated with a solution of 10.1 g of manganese nitrate (Mn (NO$_3$)$_2$.4H$_2$O) in 100 mL of water and subsequently evaporated to dryness in a rotation evaporator. Following drying for 5 h at 110° C. the catalyst was calcined for 16 h at 600° C. under N$_2$. The resulting catalyst contained 70 wt % of Zr and 2.5 wt % of Mn.

II. Polymerization of Isobutene

The number average of the molecular weight $M_n$, also referred to below as the average molecular weight $M_n$ was determined by means of gel permeation chromatography (GPC) using standardized polyisobutenes as calibrating substances. The number average $M_n$ was calculated from the resulting GPC-chromatograms according to the equation $$M_n = \Sigma c_i / \Sigma (c_i/M_i),$$

where $c_i$ stands for the concentration of the individual polymer species in the resulting polymer mixture and $M_i$ stands for the molecular weight of the individual polymer species i. The distribution of molecular weights, also referred to as dispersity (D), was calculated from the ratio of the weight average ($M_w$) and the number average ($M_n$) according to the equation $$D = M_w/M_n$$

where the weight average $M_w$ was ascertained from the resulting GPC-chromatograms according to the following equation:

$$M_w = \Sigma c_i M_i / \Sigma c_i$$

The α-olefin plus β-olefin content (formulas I and II) was determined by $^{13}$C-NMR spectroscopyly.

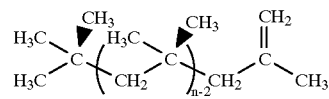

I

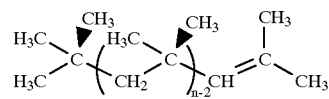

II

The C atoms of the terminal double bond of the α-olefins I give signals in the $^{13}$C-NMR spectrum at a chemical shift of 114.4 ppm (CH$_2$) and 143.6 ppm (C). The signals of the C atoms of the trisubstituted double bond of the β-olefins II are in the $^{13}$C-NMR spectrum at 127.9 (=CH—R) and 135.4 ppm of (=C(CH$_3$)$_2$). By evaluation of the signal areas and comparison with the signal areas of the remaining olefinic C atoms it is possible to determine the content of α- and β-olefins. The solvent used was deuterated chloroform (CDCl$_3$) and the internal standard was tetramethylsilane.

Example 1

In a 25 mL autoclave of glass 10 g of isobutene were condensed under a blanket of argon at −70° C. Following the addition of 0.1 g of catalyst A which had previously been redried at 180° C./0.3 mbar, the vessel was sealed and the suspension stirred for 6 h at 0° C. under the autogenous pressure of the reaction system. The polymerization mixture was then diluted at 0° C. with 10 g of n-hexane. Unconverted isobutene was evaporated off at room temperature, the catalyst filtered off and the added solvent was removed from the filtrate by distillation at room temperature and with slow lowering of the pressure down to 0.3 mbar. Low molecular weight isobutene oligomers were separated from the resulting polyisobutene by bulb-tube distillation at 120° C./0.3 mbar. The colorless polyisobutene obtained in a yield of 44% had an average molecular weight $M_n$ of 730 dalton, a distribution of molecular weights D of 2.7 and a content of terminal double bonds (=α-olefin content) of 74 mol %. The β-olefin content was 25 mol %.

Examples 2 to 10

Examples 2 to 10 were carried out as described in Example 1. The results of these batch experiments using different catalysts and different amounts of catalyst are listed in Table 1 below.

TABLE 1

Polymerization of Pure Isobutene
Polymerization conditions:
polymerization temperature: 0° C.;
autogenous pressure;
polymerizing period: 6 h;
amount used: 10 g of isobutene

| Ex. No. | Catalyst | Amount of catalyst [g] | Yield[1] [%] | S(I)[2] [mol %] | S(I+II)[3] [mol %] | $M_n$ | D |
|---|---|---|---|---|---|---|---|
| 2 | B | 0.1 | 41 | 68 | 87 | 1210 | 2.6 |
| 3 | C | 0.1 | 25 | 67 | 94 | 880 | 2.6 |
| 4 | D | 0.1 | 76 | 67 | 86 | 860 | 3.4 |
| 5 | E | 1.0 | 89 | 66 | 96 | 1260 | 3.7 |
| 6 | F | 1.0 | 20 | 74 | 98 | 1000 | 2.7 |
| 7 | G | 1.0 | 20 | 85 | 98 | 1230 | 3.1 |
| 8 | H | 1.0 | 72 | 58 | 84 | 2840 | 3.8 |
| 9 | I | 1.0 | 23 | 82 | 99 | 1680 | 2.5 |
| 10 | K | 1.0 | 7 | 60 | 99 | 2600 | 3.8 |

[1] evaporation residues following bulb-tube distillation (120° C./0.3 mbar) based on isobutene used
[2] S(I) = content of terminal double bonds = -olefin content
[3] S(I+II) = content of terminal double bonds plus content of β-olefinic double bonds + content

Examples 11 to 16

Examples 11 to 16 were carried out as described in Example 1 except that instead of pure isobutene a synthetic mixture of equal parts by weight of isobutene and isobutane was used. The results thus obtained are listed in Table 2 below.

TABLE 2

Polymerization of an Isobutene/isobutane Mixture
Polymerization conditions:
autogenous pressure;
polymerizing period: 6 h;
amount used: 5 g of isobutene + 5 g of isobutane

| Ex. No. | Catalyst | Amount of catalyst [g] | Yield[1] [%] | S(I)[2] [mol %] | S(I+II)[3] [mol %] | $M_n$ | D | Temp[4] [°C.] |
|---|---|---|---|---|---|---|---|---|
| 11 | A | 0.05 | 14 | 78 | 96 | 500 | 2.1 | 0 |
| 12 | L | 0.14 | 26 | 68 | 81 | 660 | 3.4 | 0 |
| 13 | C | 0.50 | 75 | 58 | 88 | 960 | 2.8 | −10 |
| 14 | D | 0.25 | 44 | 78 | 99 | 800 | 2.9 | −10 |
| 15 | F | 0.50 | 79 | 59 | 86 | 1900 | 3.3 | −10 |
| 16 | G | 1.00 | 27 | 52 | 84 | 640 | 2.4 | −10 |

[1] evaporation residues following bulb-tube distillation (120° C./0.3 mbar) based on isobutene used
[2] S(I) = content of terminal double bonds = -olefin content
[3] S(I+II) = content of terminal double bonds plus content of β-olefinic double bonds + content
[4] polymerization temperature

Example 17

Example 17 was carried out as described in Example 1 except that instead of pure isobutene an isobutene-containing $C_4$ cut (refined product I) having the following composition was used as starting material:

43 wt % of isobutene, 26 wt % of 1-butene, 13 wt % of 2-butene isobutene, 13 wt % of n-butane, 5 wt % of isobutane Polymerization Conditions polymerization temperature: 0° C.;

autogenous pressure;

polymerizing period: 6 h;

amount used: 10 g of refined product I;

polymerization catalyst: catalyst E;

amount of catalyst used: 2 g

The yield of polyisobutene having an average molecular weight $M_n$ of 1260 dalton was, following bulb-tube distillation at 120° C./0.3 mbar, 8%. The content of terminal double bonds was 64 mol % (α-olefin) and the content of β-olefin 15 mol %. For the distribution of molecular weights D a value of 3.7 was ascertained.

Examples 18 to 21

The catalysts M, N, O, and P were tested in batchwise polymerization experiments. Each experiment was carried out as described in Example 1. The test results are listed in Table 3 below.

TABLE 3

Isobutene Polymerization Using Pure Isobutene
Polymerization temperature: 0° C.;
autogenous pressure;
reaction time 6 h;
10 g of pure isobutene

| Ex. No. | Catalyst | Amount of catalyst [g] | Yield[1] [%] | S(I)[2] [mol %] | S(I+II)[3] [mol %] | $M_n$ | D |
|---|---|---|---|---|---|---|---|
| 18 | M[6] | 1 | 26 | 58 | 98 | 1130 | 2.8 |
| 19 | N | 2 | 3[4] | 62 | 97 | 1250 | 3.5 |
| 20 | O | 2 | 6[5] | 57 | 95 | 580 | 2.6 |
| 21 | P | 2 | 39 | 50 | 91 | 870 | 3.7 |

[1]evaporation residues following bulb-tube distillation (120° C./0.3 mbar) based on isobutene used
[2]S(I) = -olefin content
[3]S(I+II) = content of α+β-olefin
[4]reaction time: 0.5 h
[5]reaction time: 1 h
[6]in the polyisobutene prepared with catalyst M no chlorine could be detected by elementary analysis Comparative Examples The polymerization test of Example 1 was repeated using two differently pretreated, pure zirconium dioxide samples. The first zirconium dioxide sample (manufactured by MEL-Chemicals) had been calcined for 3 h at 400° C. and redried at 180° C./0.3 mbar prior to use, whereas the other zirconium dioxide sample had been calcined for 3 h at 600 ° C. and redried prior to use in the manner described for the first zirconium dioxide sample. Following purification of the reaction mixture in the manner described in Example 1 and concentration of the filtrate no polymeric residues could be found in either case.

Polymerization with a Molybdenum-containing Catalyst (Comparison)

The catalyst described in Example 1 of JP-A 139429/1981 was prepared, calcined at 500° C. and used in the form of a powder in the polymerization of isobutene. Batchwise polymerization of 10 g of isobutene in the presence of 1 g of this catalyst, which had been redried directly prior to use, at 180° C. and a pressure of 0.3 mbar, was carried out as described in Example 1 with cooling with ice. The polymerizing period was 6 h. Following purification of the reaction mixture and bulb-tube distillation (as described in Example 1 ) there were obtained 5.3 g of polymeric bottoms having a content of terminal double bonds of only 11 mol % and a β-olefin content of 20 mol %. The average molecular weight $M_n$ was 970 dalton and the dispersity D 3.5.

We claim:

1. A process for the preparation of halogen-free, reactive polyisobutene having a content of terminal double bonds of more than 50 mol % and an average molecular weight $M_n$ of from 500 to 5000 dalton by the cationic polymerization of isobutene or isobutene-containing hydrocarbon mixtures in the liquid phase, wherein the polymerization is carried out at a temperature of from −30° to +40° C. over a heterogeneous polymerization catalyst containing at least one element acting as promoter and selected from Group IB, Group IIB, Group IIIB, Group IVB, Group VB, Group VIIB, or Group VIIIB of the Periodic Table or from Group IIA, Group IIIA, Group IVA, Group VA, or Group VIA of the Periodic Table or a number of said elements in each case in the form of an oxygen-containing compound and zirconium in the form of an oxygen-containing compound, said polymerization catalyst substantially halogen-free.

2. A process as defined in claim 1, wherein a polymerization catalyst is used which contains an oxygen-containing sulfur compound.

3. A process as defined in claim 1, wherein a polymerization catalyst is used which contains an oxygen-containing phosphorus compound.

4. A process as defined in claim 1, wherein a polymerization catalyst is used which contains an oxygen-containing silicon, germanium and/or tin compound.

5. A process as defined in claim 1, wherein a polymerization catalyst is used which contains an oxygen-containing boron, aluminum, gallium and/or indium compound.

6. A process as defined in claim 1, wherein a polymerization catalyst is used which contains an oxygen-containing compound of zinc.

7. A process as defined claim 1, wherein a polymerization catalyst is used which contains an oxygen-containing compound of copper.

8. A process as defined in claim 1, wherein a polymerization catalyst is used which contains an oxygen-containing compound of magnesium, calcium, strontium, and/or barium.

9. A process as defined in claim 1, wherein a polymerization catalyst is used which contains an oxygen-containing compound of scandium, yttrium, lanthanum, and/or cerium.

10. A process as defined in claim 1, wherein a polymerization catalyst is used which contains an oxygen-containing compound of titanium and/or hafnium.

11. A process as defined in claim 1, wherein a polymerization catalyst is used which contains an oxygen-containing compound of vanadium, niobium, and/or tantalum.

12. A process as defined in claim 1, wherein a polymerization catalyst is used which contains an oxygen-containing compound of manganese and/or rhenium.

13. A process as defined in claim 1, wherein a polymerization catalyst is used which contains an oxygen-containing compound of iron, cobalt, and/or nickel.

14. A process as defined in claim 1, wherein a polymerization catalyst is used which contains, in addition to an oxygen-containing compound of phosphorus and/or sulfur, one or more oxygen-containing compounds of elements effective as promoters and selected from Group IB, Group IIB, Group IIIB, Group IVB, Group VB, Group VIIB, or Group VIIIB of the Periodic Table or from Group IIIA or Group IVA of the Periodic Table or mixtures of oxygen-containing compounds of said elements.

15. A process as defined in claim 1, wherein a polymerization catalyst is used which contains, in addition to an oxygen-containing compound of phosphorus and/or sulfur, one or more oxygen-containing compounds of elements effective as promoters and selected from Group VIIB or Group VIIIB of the Periodic Table or from Group IIIA of the Periodic Table or mixtures of oxygen-containing compounds of said elements.

16. A process as defined in claim 1, wherein a polymerization catalyst is used which contains, in addition to an oxygen-containing compound of phosphorus and/or sulfur, an oxygen-containing compound of iron, manganese, or aluminum or mixtures of oxygen-containing compounds of these elements.

17. A process as defined in claim 1, wherein polymerization catalysts are used which have been prepared by impregnation of zirconium hydroxide or zirconium dioxide with compounds of one or more elements effective as promoters, drying, and calcination at temperatures of from 300° to 1000° C.

18. A process as defined in claim 1, wherein polymerization catalysts are used which have been prepared by impregnation of zirconium hydroxide or zirconium dioxide with compounds of one or more elements effective as promoters, drying, and calcination at temperatures of from 400° to 800° C.

19. A process as defined in claim 1, wherein polymerization catalysts are used which have been prepared by co-precipitation of zirconium hydroxide with one or more elements effective as promoters, drying of the resulting precipitate and calcination at temperatures of from 300° to 1000° C.

20. A process as defined in claim 1, wherein the calcined polymerization catalyst is dried prior to use at temperatures of from 150° to 300° C.

* * * * *